United States Patent Office 3,537,900
Patented Nov. 3, 1970

3,537,900
DEICING AIRCRAFT WINDSCREENS
Stuart Halbert, Melkridge Hall, near Haltwhistle, England, assignor to Kilfrost Limited, Haltwhistle, England, a British company
No Drawing. Filed Sept. 8, 1967, Ser. No. 666,486
Claims priority, application Great Britain, Sept. 16, 1966, 41,526/66
Int. Cl. B08b 3/04
U.S. Cl. 134—42                                     4 Claims

ABSTRACT OF THE DISCLOSURE

A washing liquid for use on vehicle windscreens, in particular aircraft windscreens, which is highly effective as a deicer, and in removing salt and other deposits such as insect debris e.g. fly bodies which normally foul the windscreens. The new washing liquids are aqueous solutions of mono- and polyethers of polyalcohols.

BACKGROUND OF THE INVENTION

This invention relates to washing liquids generally, and is particularly concerned with liquids for deicing and washing the windscreens of vehicles, in particular aircraft, and with the washing methods employed.

A real problem in aircraft operation is caused by the occurrence of icing on the aircraft windscreens. and also of salt crusts. Aircraft windscreens are also frequently fouled with the bodies of insects such as flies.

Various attempts have been made to deal with these problems. In particular, monohydric alcohols and various polyhydric alcohols such as ethylene glycol, propylene glycol and glycerol have been commonly used as active deicing constituents in deicing fluids. The lower alcohols have the disadvantage that they represent a fire hazard and also that they cause crazing in certain acrylic materials used for aircraft windscreens. Furthermore, the known washing liquids often themselves leave deposits.

It is an object of the present invention to provide an effective windscreens washing fluid, in particular for aircraft windscreens, which has deicing properties.

It is another object of the invention to provide a liquid for washing windscreens, in particular aircraft windscreens, which is effective in the removal of deposits including salts crusts and insect debris such as flies.

It is a further object of the invention to provide an improved washing and deicing liquid for use on windscreens, e.g. aircraft windscreens which does not have the disadvantages of the known liquids such as fire hazards, crazing of the windscreens and the leaving of deposits thereon which impair vision.

SUMMARY OF THE INVENTION

It has now been found that aqueous solutions of mono- and polyethers of polyalcohols are particularly effective in their washing properties both as regards deicing and as regards the removal of deposits such as salt crusts and insect bodies such as flies. The range of concentrations of the mono- and polyethers in the aqueous solutions is normally from about 25% to about 50% based on the solution.

Accordingly, the washing liquid of the invention, which is particularly suitable for vehicle windscreens, more particularly aircraft windscreens, essentially consists of an aqueous solution containing from about 25% to 50% of a monoether or a polyether of a polyalcohol or of various mixtures of mono- and polyethers.

In general, monoethers of mono- and dialkylene glycols are found suitable, for example, water-soluble ethylene glycol monoalkyl ethers, diethylene glycol monoalkyl ethers and propylene glycol monoalkyl ethers. The preferred alkyl group is methyl and the active constituent of choice in the washing liquids of the invention is ethylene glycol monomethylether.

The invention also consists in a method of washing vehicle windscreens, in particular aircraft vehicle windscreens, which consists in applying thereto a sufficient amount of an aqueous solution containing from 25% to 50% of a mono- or polyether of a polyalcohol to satisfactorily remove ice or deposits such as salt crusts and insect bodies from the windscreen.

Although a 40% aqueous solution of ethylene glycol monomethyl ether (EGMME) has been found satisfactory, the strength of the solution is largely controlled by the lower temperature likely to be encountered in service. For example, in the case of EGMME, a 40% concentration is suitable for temperatures down to −20° C. and a 50% concentration is more suitable for temperatures down to −30° C.

The washing liquids of the invention have various advantages over the known liquids such as those containing ethyl alcohol which are used as standard windscreen deicing fluids (British standard specification No. 3591-68-OP). Thus, for example, they represent a much lower fire hazard and they do not have any tendency to craze the acrylic materials often used for aircraft windscreens. They are also more effective in removing salt crusts and insect debris such as flies from the windscreens whilst tunnel tests simultating icing conditions at temperatures between 0° C. and −30° C. have shown that these washing liquids are at least equal in deicing effectiveness to the standard windscreen deicing fluids which have the latter disadvantages. The washing liquids of the invention also have the advantage that they leave no deposit or very much less deposit than the conventional washing liquids.

It is within the scope of this invention to include other additives in the windscreen washing liquids of the invention. Thus, the washing liquids of the invention may contain small amounts of conventional corrosion inhibitors and surface-active agents.

DESCRIPTION OF PREFERRED EMBODIMENTS

The following examples are further illustrative of the present invention but it will be understood that the invention is not limited thereto.

EXAMPLE 1

This is an example of a formulation which is particularly effective for salt removal and/or cleaning but which also has deicing properties. The formulation contains the following constituents:

|   | Parts |
|---|---|
| EGMME | 20 |
| Mains water | 80 |
| Triethanolamine | 0.1 |
| Conventional non-ionic wetting agent | 0.5 |

The formulation is made simply by mixing these constituents in any order and we have found by tests that it is particularly effective for the removal of salt crusts and the general cleaning of aircraft windscreens and that it leaves little or no deposit thereon.

EXAMPLE 2

This formulation is particularly effective for the removal of salt deposits and for deicing. The formulation consists of:

|   | Parts |
|---|---|
| EGMME | 40 |
| Mains water | 60 |
| Tirethanolamine | 0.1 |

This composition is prepared simply by mixing the constituents in any order and tests have shown its effectiveness for the removal of salt crusts and as a deicing liquid.

EXAMPLE 3

This formulation is particularly effective for the removal of fly debris and as a deicing liquid but it is also effective for the removal of salt crusts. The formulation consists of:

| | Parts |
|---|---|
| EGMME | 50 |
| Distilled or demineralised water | 50 |

The composition is simply made by mixing the EGMME constituent with the water to form a solution.

Further examples of formulations, all of which have similar deicing and deposit removing properties but which might be preferred where deicing is not the major requirement are:

EXAMPLE 4

| | Parts |
|---|---|
| EGMME (ethylene glycol monoethyl ether) | 25 |
| Mains water | 75 |
| Triethanolamine | 0.1 |

EXAMPLE 5

| | |
|---|---|
| EGMME | 40 |
| Mains water | 60 |
| Triethanolamine | 0.1 |
| Conventional non-ionic wetting agent | 0.5 |

EXAMPLE 6

| | |
|---|---|
| EG di-ME (ethylene glycol dimethylether) | 25 |
| Mains water | 75 |
| Triethanolamine | 0.1 |

EXAMPLE 7

| | |
|---|---|
| EG di-ME | 50 |
| Mains water | 50 |
| Triethanolamine | 0.1 |

EXAMPLE 8

| | |
|---|---|
| Propylene GMME (propylene glycol monomethylether) | 25 |
| Mains water | 75 |
| Triethanolamine | 0.1 |
| Non-ionic wetting agent | 0.5 |

EXAMPLE 9

| | |
|---|---|
| Propylene GMME | 40 |
| Mains water | 60 |
| Triethanolamine | 0.1 |

It should be understood that the foregoing disclosure relates only to preferred embodiments of the invention and that it is intended to cover all changes and modifications of the examples of the invention herein chosen for the purpose of disclosure which do not constitute departures from the scope and spirit of the invention set forth in the appendant claims.

I claim:

1. A method of deicing aircraft comprising the step of applying to an aircraft windscreen an effective amount of a deicing liquid essentially conssting of an aqueous soluton of a monoalkylether of a monoalkylene glycol selected from the group consisting of monoethylene glycol monomethylether and monoethylene glycol monoethylether, said monoalkylether of said monoalkylene glycol being present in said aqueous solution in a proportion of from about 25% to about 50% by volume based on said solution.

2. A method of deicing aircraft comprising the step of applying to an aircraft windscreen an effective amount of a deicing liquid consisting of 40 parts by volume of ethylene glycol monomethylether, 60 parts by volume of mains water and 0.1 part by volume of triethanolamine.

3. A method of deicing aircraft comprising the step of applying to an aircraft windscreen an effective amount of a deicing liquid consisting of 50 parts by volume of ethylene glycol monomethylether and 50 parts by volume of demineralized water.

4. A method of deicing aircraft comprising the step of applying to an aircraft windscreen an effective amount of a deicing liquid consisting of 40 parts by volume of ethylene glycol monoethylether, 60 parts by volume of mains water, 0.1 part by volume of triethanolamine and 0.5 part of a non-ionic wetting agent.

References Cited

UNITED STATES PATENTS

| | | | |
|---|---|---|---|
| 2,399,267 | 4/1946 | Szatyn | 134—40 XR |
| 2,454,886 | 11/1948 | Sapiro | 106—13 XR |
| 2,677,630 | 5/1954 | Scales | 134—23 |
| 2,775,533 | 12/1956 | Healy | 134—22 XR |
| 3,239,467 | 3/1966 | Lipinski | 134—40 XR |
| 3,245,912 | 4/1966 | White | 106—13 XR |
| 3,249,550 | 5/1966 | Metters | 106—13 XR |

MORRIS O. WOLK, Primary Examiner

J. T. ZATARGA, Assistant Examiner

U.S. Cl. X.R.

106—13; 134—40; 252—70